United States Patent

Sasako

Patent Number: 6,074,070
Date of Patent: Jun. 13, 2000

[54] SURFACE LIGHT SOURCE DEVICE OF SIDE LIGHT TYPE

[75] Inventor: Hiromi Sasako, Tokyo, Japan

[73] Assignees: Enplas Corporation, Kawaguchi; Yasuhiro Koike, Yokohama, both of Japan

[21] Appl. No.: 08/901,731

[22] Filed: Jul. 28, 1997

[30] Foreign Application Priority Data

Jul. 29, 1996 [JP] Japan ................................. 8-216090

[51] Int. Cl.$^7$ ....................................................... F21V 7/04
[52] U.S. Cl. ............................ 362/31; 362/301; 362/308
[58] Field of Search ............................ 362/31, 298, 299, 362/300, 301, 307, 308, 321, 351

[56] References Cited

U.S. PATENT DOCUMENTS

| 5,283,673 | 2/1994 | Murase | 359/49 |
| 5,688,035 | 11/1997 | Kashima | 362/31 |
| 5,788,356 | 3/1996 | Watai | 362/31 |

FOREIGN PATENT DOCUMENTS 7-198956   8/1995   Japan .

*Primary Examiner*—Sandra O'Shea
*Assistant Examiner*—Peggy A Neils
*Attorney, Agent, or Firm*—Staas & Halsey LLP

[57] ABSTRACT

In a surface light source device of side light type applied to a liquid crystal display or the like, particularly, a surface light source device of side light type with emitting directivity, irregularities in luminance of output light are prevented from occurring in the vicinity of an incidence surface. In a surface light source device of side light type 10, a diffusible area M1 to diffusely reflect illumination light and an absorptive area (on a reflection sheet 11) to restrain the illumination light from reflection from bands in the vicinity of the incidence surface oppositely with the emitting surface of a light guide plate 12 with emitting directivity. It is thereby possible to reduce irregularities in output light luminance occurring in the vicinity of the incidence surface T. A light reflection member 18 may be arranged so as to extend over an edge EU of the emitting surface of the light guide plate 12, with directivity of illumination light emitted from the the emitting surface being modified. A light blocking material may be arranged on a side end surface of a light control member 13 to prevent illumination light emitted from a light source from being directly incident. Illumination light incident on the edge EU of the light guide plate may be blocked by a light blocking member 18. The diffusible area may be formed by roughening a surface opposite with the emitting surface.

6 Claims, 6 Drawing Sheets

10: SURFACE LIGHT SOURCE DEVICE OF SIDE LIGHT TYPE

1: SURFACE LIGHT SOURCE DEVICE OF SIDE LIGHT TYPE

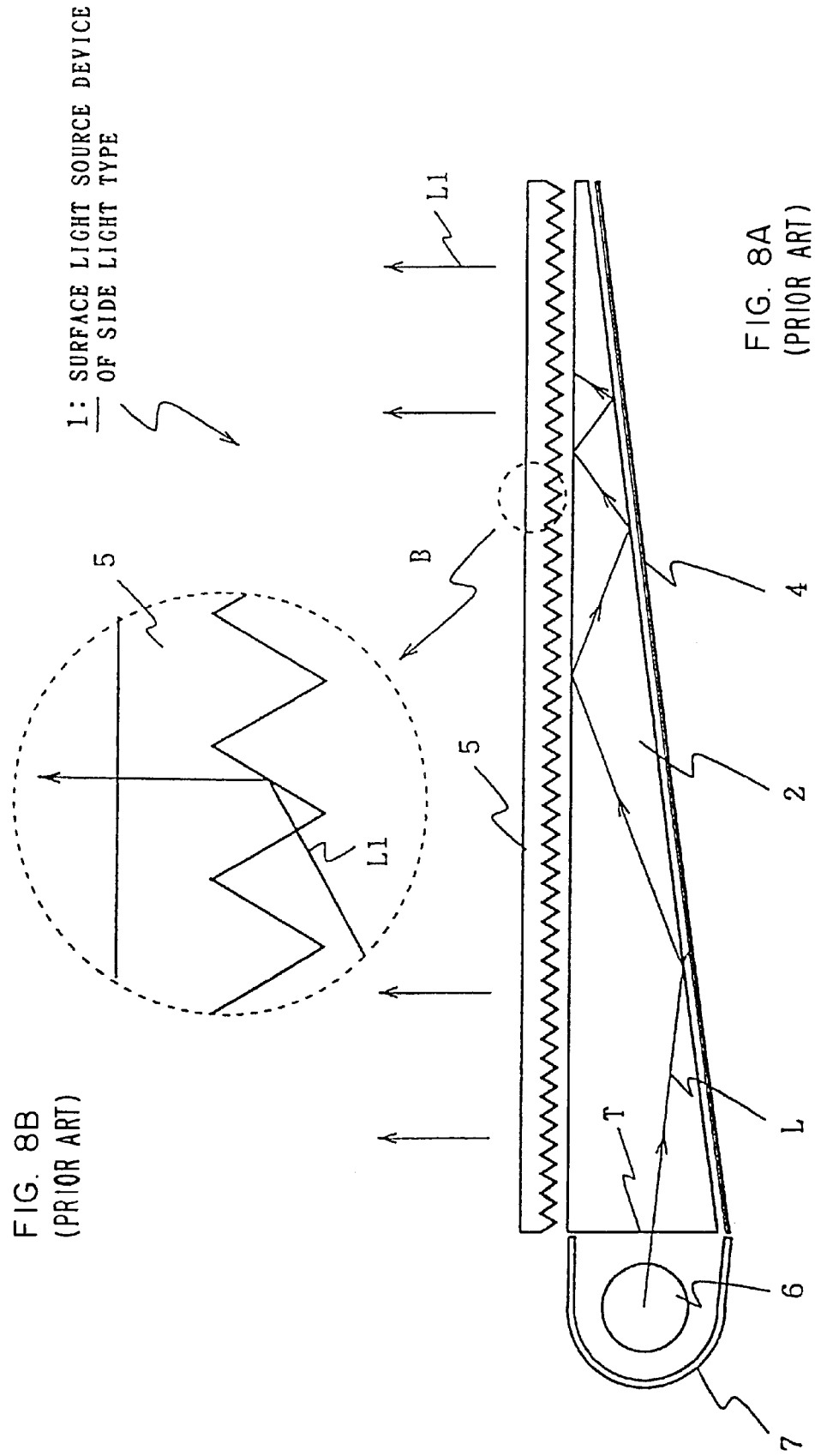

SURFACE LIGHT SOURCE DEVICE OF SIDE LIGHT TYPE

BACKGROUND

1. Field of Invention

This invention relates to a surface light source device of side light type employing a light guide plate. The surface light source device of side light type in the present invention is applied to back lighting in a liquid crystal display, for instance.

2. Related Art

A surface light source device of side light type has been conventionally applied to a liquid crystal display, for instance, and illuminates a liquid crystal panel from the back surface. This arrangement is suitable to reduce thickness of the device as a whole.

In the surface light source device of side light type, a rod-shaped light source such as a cold cathode tube is usually employed as a primary light source to be arranged on the lateral side of a light guide plate (a plate-shaped light guide). Illumination light emitted from the primary light source is introduced into the light guide plate through a side end surface of the light guide plate. The introduced illumination light makes a propagation through the light guide plate, and in this process, emission of light from a major surface of the light guide plate occurs toward a liquid crystal panel.

A well-known light guide plate employed in the surface light source device of side light type described above includes a light guide plate of a type having an approximately uniform thickness and a light guide plate of a type showing a tendency to reduce thickness according to distance from the primary light source. Generally, light guide plates of the latter type emit illumination light more efficiently than the former type.

FIG. 7 is an exploded perspective view showing a surface light source device of side light type employing light guide plate of the latter type. Referring to FIG. 7, a surface light source device of side light type 1 has a light scattering guide plate (a light guide plate made of a light scattering guide) 2, a primary light source 3 arranged on the lateral side of the light scattering guide plate, a reflection sheet 4 and a prism sheet 5 functioning as a light control member. The reflection sheet 4, the light scattering guide plate 2 and the prism sheet 5 are laminatedly arranged.

The primary light source 3 has a cold cathode tube (a fluorescent lamp) 6 and a reflection member (a reflector) 7 of a generally semi-circular section arranged around the cold cathode tube. Illumination light impinges on a side end surface of the light scattering guide plate 2 through an opening in the reflector 7. The reflection sheet 4 adopts a sheet-shaped regular reflection member made of metal foil or the like, or a sheet-shaped diffuse reflection member made of a white PET film or the like.

The light scattering guide plate 2 has a wedge-shaped section, and consists of a matrix made of polymethyl methacrylate (PMMA), for instance, and light transmitting fine particles uniformly distributed in the matrix and having deflective index different from that of the matrix.

FIG. 8, including FIGS. 8A and 8B shows a section taken along a line VIII—VIII in FIG. 7. Referring to FIG. 8, illumination light L from the primary light source 3 is introduced into the light scattering guide plate 2 through an incidence surface T serving as one side end surface of the light scattering guide plate 2, and makes a propagation toward an end portion while undergoing repetitive reflection between a plane (which will be hereinafter referred to as "a slope"), along which the reflection sheet 4 is disposed, and a plane (which will be hereinafter referred to as "an emitting surface"), along which the prism sheet 5 is disposed. In the process, the illumination light L undergoes scattering caused by the light transmitting fine particles. If a reflection sheet 4 is made of a diffuse reflection member, the illumination light is affected by an action of diffuse reflection as well.

Every time the illumination light L repeats reflection on the slope, the angle of incidence with respect to the emitting surface is reduced little by little. Reduction in angle of incidence results in an increase of a component equal to the critical angle or less with respect to the emitting surface, urging emission from the emitting surface onward. It is thereby possible to prevent output light from being insufficient in an area distant from the primary light source 3.

Illumination light L1 emitted from the emitting surface undergoes scattering caused by the light transmitting fine particles or diffuse reflection caused by the reflection sheet 4, and therefore, shows the properties of scattered light. However, a main propagation direction of the emitted illumination light L1 is tilted toward an end portion (a direction reverse to the primary light source 3) with respect to the emitting surface. That is, the emitted illumination light L1 has directivity. The surface light source device of side light type 1 employing the above light guide plate generates illumination light having emitting directivity.

The prism sheet 5 is made of a light transmitting sheet material such as polycarbonate and has a prism surface. The prism sheet 5 is arranged so that the prism surface faces the light scattering guide plate 2. The prism surface is composed of a large number of projections, each of which has a triangular section and runs substantially parallel to the incidence surface T of the light scattering guide plate 2. The prism sheet 5 modifies a main emitting direction of the emitted illumination light L1 with a slope of each projection so as to emit the illumination light L1 in a frontal direction of the emitting surface. There is also a case where a prism sheet having prism surfaces on both surfaces is used. In this case, projections forming one prism surface run in a direction respectively orthogonal to projections forming the other prism surface.

In general, the surface light source device of side light type 1 employing the light guide plate of the wedge-shaped section as described above emits illumination light in a frontal direction more efficiently than a surface light source device of side light type employing a light guide plate substantially uniform in thickness.

In some cases, surface light source devices of side light type may employ, as a light guide plate with emitting directivity, a light guide plate having a scattering film, a roughened surface or the like formed on one surface and/or the other surface (i.e. on an emitting surface and/or a back surface) of a transparent member or a semi-transparent member in the shape of a wedge or the like. Such light guide plates also emit illumination light in a frontal direction efficiently.

OBJECT AND SUMMARY OF INVENTION

In the surface light source device of side light type employing a light guide plate with emitting directivity as described above, irregularities in luminance easily occur in the vicinity of the incidence surface. As shown in FIG. 7, a linear portion K (which will be hereinafter referred to as "a bright line") showing high luminance level and a band-like portion (which will be hereinafter referred to as "a dark band") showing low luminance level occur in parallel to the incidence surface at certain intervals. This phenomenon is called "reflective appearance".

The bright line occurs since illumination light having been incident on the light guide plate through upper and lower edge portions of the incidence surface, is emitted from the emitting surface and the emitted illumination light is observed from the emitting surface. On the other hand, the dark band has a width substantially corresponding to a thickness of the incidence surface and luminance level of the dark band is lower than averaged luminance of the emitting surface. Owing to the irregularities in luminance accompanied with the bright line and the dark band, it is difficult for the surface light source device of side light type employing a light guide plate with emitting directivity to adopt an emitting surface area in the vicinity of the incidence surface as an effective luminant portion. There has been a demand that the above problem should be solved in order to realize a surface light source device of high quality by effectively making use of the emitting surface.

According to one method to solve the above problem, a light diffusion sheet having light diffusibility is arranged on the emitting surface of the light guide plate, and thereby makes it hard to visually observe irregularities in luminance. However, the light diffusion sheet spoils emitting directivity of the light guide plate, and becomes hard to efficiently emit illumination light in a frontal direction. That is, basic functions required for the surface light source device are much degraded, so that it is not preferable to put the above method to practical use.

An object of the present invention is to provide a surface light source device of side light type which can reduce the above irregularities in luminance in the vicinity of the incidence surface.

In order to attain the above object, according to the present invention, in a surface light source device of side light type applied to a liquid crystal display or the like, particularly, a surface light source device of side light type with emitting directivity, irregularities in luminance of output light are prevented from occurring in the vicinity of an incidence surface.

In a surface light source device of side light type according to the present invention, a diffusible area to diffusely reflect illumination light and an absorptive area to restrain the illumination light from reflection from bands in the vicinity of an incidence surface on the side of a surface opposite with an emitting surface of a light guide plate, preferably, with emitting directivity. It is thereby possible to reduce irregularities in output light luminance occurring in the vicinity of the incidence surface.

A light reflection member may be arranged so as to extend over an edge of the emitting surface adjacent to a side end surface serving as the incidence surface of the light guide plate while directivity of illumination light emitted from the light guide plate is modified. A light control member may be arranged on the side of the emitting surface of the light guide plate. In this case, a light shielding material may be arranged on a side end surface of the light control member to prevent illumination light emitted from a light source from being directly incident on the light control member.

A light shielding member may be employed to block illumination light incident on the edge of the emitting surface adjacent to the side end surface serving as the incidence surface of the light guide plate. The diffusible area may be formed by roughening a surface opposite with the emitting surface.

The diffusible area provided in the shape of a band on the side of the surface opposite with the emitting surface of the light guide plate increases quantity of output light from a portion of the emitting surface corresponding to the diffusible area. On the other hand, the band-shaped absorptive area to restrain the illumination light from reflection reduces quantity of output light from another portion of the emitting surface corresponding to the diffusible area.

That is, luminance in a portion easily subjected to occurrence of the dark band is made up due to the diffusible area, while luminance level in the vicinity of the portion easily subjected to occurrence of the dark band is corrected (restrained) by the absorptive area. The diffusible area and the absorptive area are preferably formed so as to make a boundary therebetween less noticeable for the purpose of preventing them from being observed with the eye.

The light reflection member arranged so as to extend over the edge adjacent to the side end surface subjected to incidence of light from the light source emits illumination light incident through the side end surface of the light reflection member toward the diffusible area together with illumination light incident through the edge, causing both illumination light to be diffusely reflected by the diffusible area. It is thereby possible to make a bright line less noticeable, and to make up for an insufficient quantity of output light on the side of the side end surface.

If the shielding member is arranged so as to block illumination light incident on the edge on the side of the side end surface of the light guide plate, the edge is prevented from being illuminated. It becomes thereby hard to observe the edge which is brighter than the emitting surface, and the bright line is effectively prevented from occurring. In this case, it may be possible to make up for quantity of light tending to be insufficient on the side of the side end surface by causing part of illumination light to be directly incident on the light control member arranged along the emitting surface so as to modify directivity (i.e. making use of so-called leak of light).

In every case, the diffusible area may be formed by roughening a surface opposite with the emitting surface. Further, the absorptive area may be formed by adhering light absorptive ink or the like consisting of light absorptive substance to an area corresponding to the reflection sheet arranged along the roughened surface.

Hereinafter will be described the present invention in more detail with reference to the accompanying drawings.

BRIEF DESCRIPTION OF DRAWINGS

FIG. 8A is a sectional view taken along a line VIII—VIII in FIG. 7 and FIG. 8B is an enlarged view of a portion of FIG. 8A.

PREFERRED EMBODIMENTS

Figure 7:
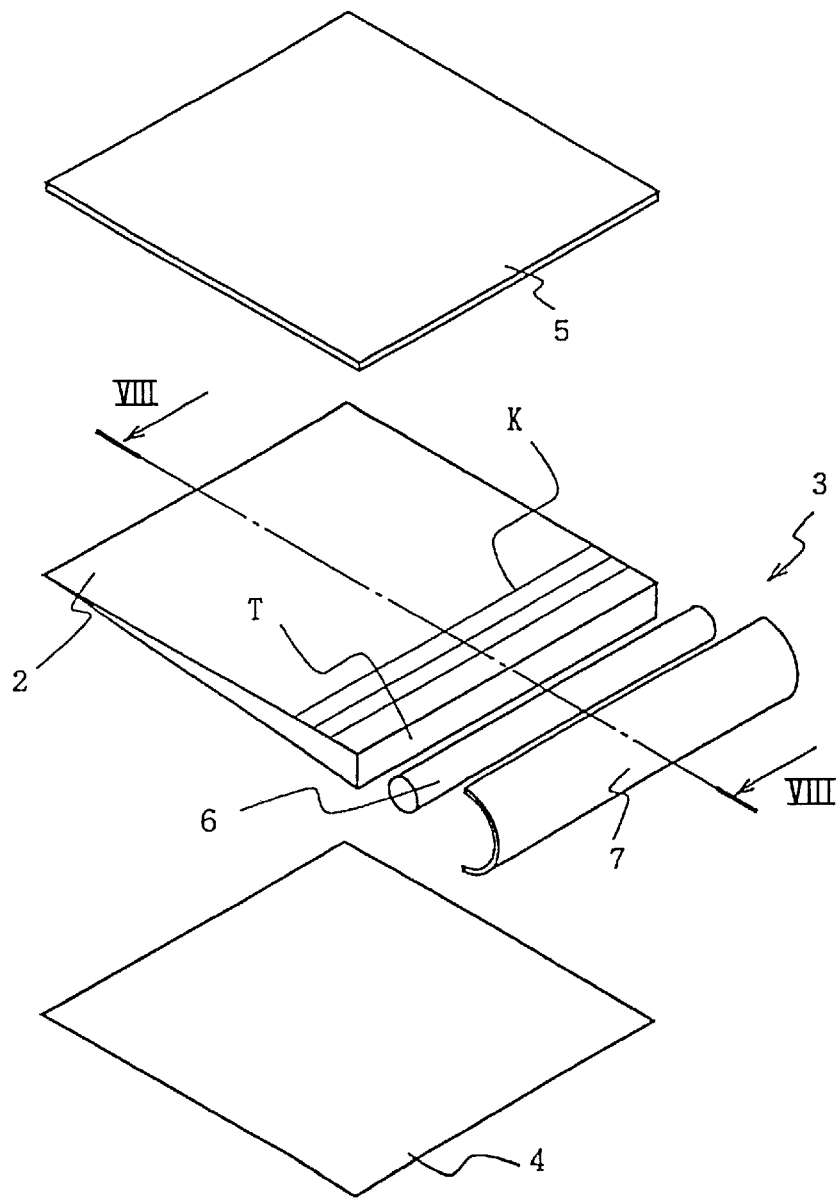
FIG. 7 is an exploded perspective view showing a surface light source device of side light type in a prior art.

In the following description, the reference numerals used in FIG. 7 are appropriately used in common, and the repeated description will be omitted.

First Embodiment

Figure 2:
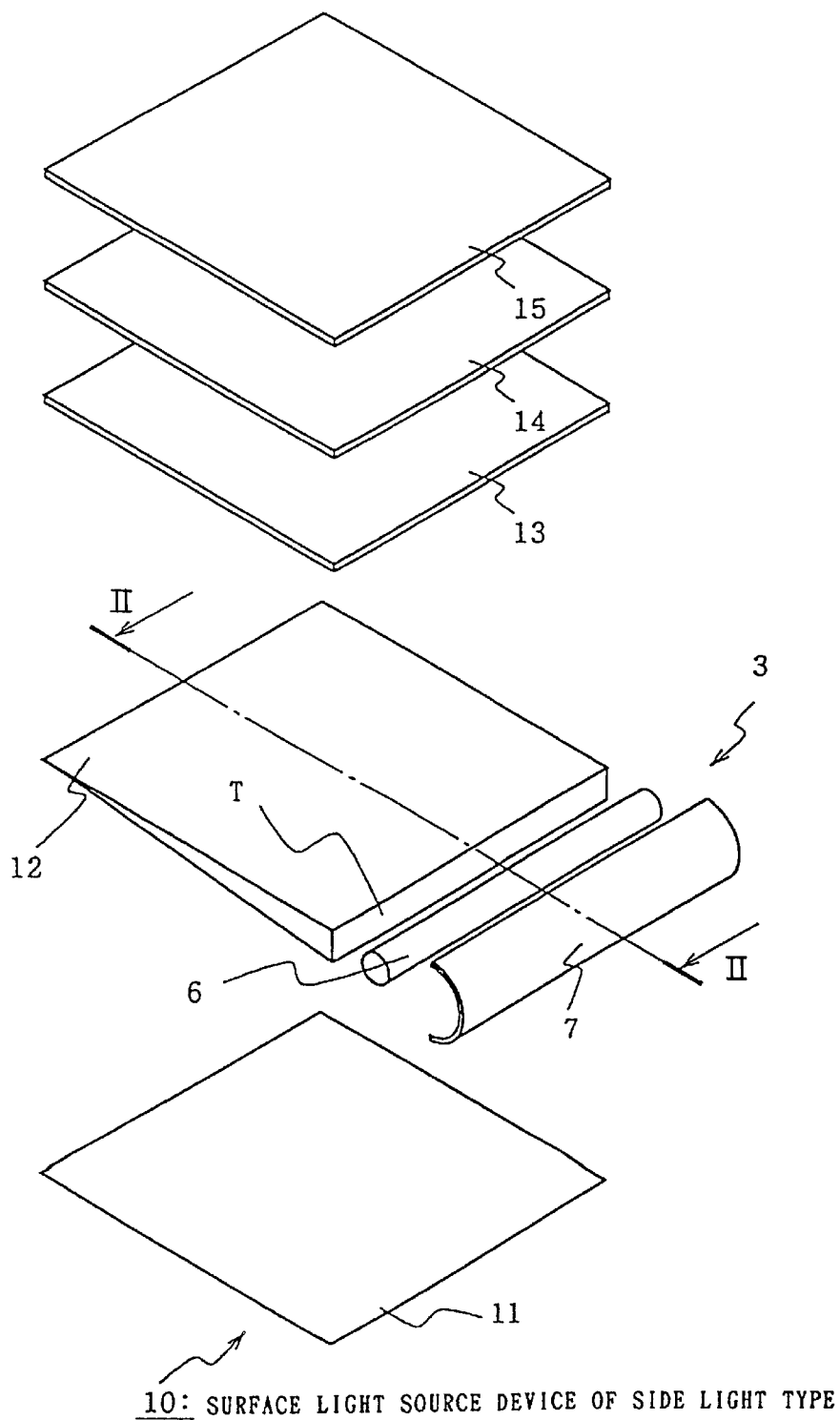
FIG. 2 is a perspective view showing the overall structure of the surface light source device of side light type shown in FIG. 1.

Referring to FIG. 2, a surface light source device of side light type 10 comprises a reflection sheet 11, a light scattering guide plate 12, a prism sheet 13, a light diffusion sheet 14 and a prism sheet 15, and these components are laminatedly arranged. The prism sheet 13 is made of a light transmitting sheet material such as polycarbonate, and has a prism surface. The prism sheet 13 is arranged so that the prism surface faces the light scattering guide plate 2, and a large number of projections of a triangular section forming the prism surface run substantially parallel to an incidence surface T of the light scattering guide plate 2. The prism sheet 13 thereby modifies a main emitting direction of output light with a slope of each projection so as to emit illumination light in a frontal direction of an emitting surface.

On the other hand, the prism sheet 15 is made of the same material as the prism sheet 13 and is arranged so that projections of the prism sheet 15 are repeatedly formed in a direction orthogonal to the direction of the repeatedly formed projections of the prism sheet 13. The prism sheet 15 thereby modifies directivity of output light with respect to a direction parallel to the incidence surface T.

The light diffusion sheet 14 is made of a light transmitting sheet material very slightly scattering light and modifies an angle of visual field of output light.

Figure 1:
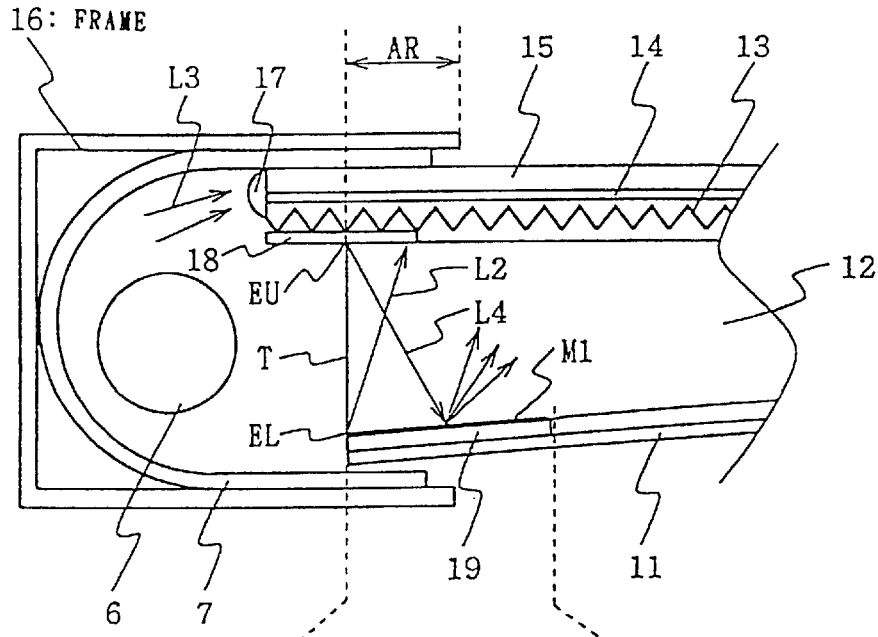
FIG. 1 is a sectional view showing a surface light source device of side light type according to the first embodiment of the present invention, together with two graphs for explaining the characteristics of a roughened surface formed on a light guide plate.
Figure 1:
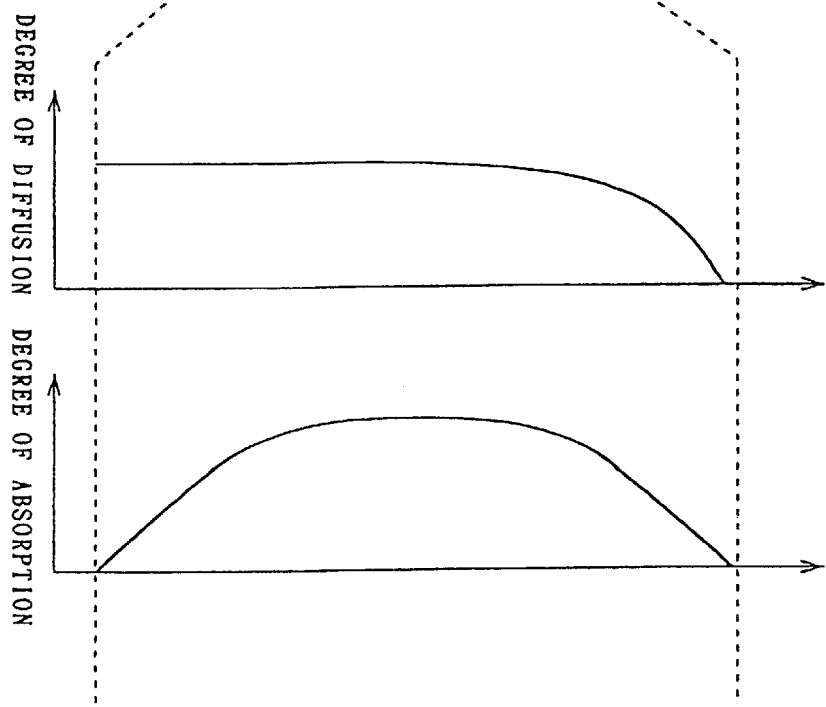

Referring to FIG. 1 (upper half part) showing a section taken along a line C—C in FIG. 2, the surface light source device of side light type 10 is wholly held by a frame 16 made of a resin material in the shape of a frame. The frame 16 is formed so that its edge on the side of the emitting surface projects from the incidence surface of the light scattering guide plate 12 by a predetermined length AR. It is thereby possible to block illumination light L2 which is incident through the incidence surface T and the lower edge EL of the light scattering guide plate 12 and is then directly emitted from the emitting surface.

For the prism sheet 13, the light diffusion sheet 14 and the prism sheet 15, black ink 17 (a light shielding material) is adhered to their edges on the side of the incidence surface T. Illumination light L3 respectively incident on the prism sheet 14, the light diffusion sheet 14 and the prism sheet 15 through their side end surfaces is blocked by the black ink 17.

In this manner, the prism sheet 13, the light diffusion sheet 14 and the prism sheet 15 effectively avoid light (so-called leak of light) which is incident through their side end surfaces and is then emitted from the emitting surface.

In the present embodiment, while light is prevented from being incident on the side end surfaces of the prism sheet 13, the light diffusion sheet 14 and the prism sheet 15, it may not be necessary to prevent light from being incident on these side end surfaces if the degree of illumination light incident through the side end surfaces is substantially negligible when leak of light occurs.

For instance, in a case where the prism sheet 13, the light diffusion sheet 14 and the prism sheet 15 are reduced in thickness, if the prism sheet 13 is arranged so that its side end surface projects from the side end surfaces of the light diffusion sheet 14 and the prism sheet 15 toward the fluorescent lamp 6, part of illumination light incident on the side end surfaces of the light diffusion sheet 14 and the prism sheet 15 is blocked by the prism sheet 13.

A silver sheet 18 made of a regular reflection member is arranged so as to extend over an upper edge EU (adjacent to the side end surface providing the incidence surface) of the light scattering guide plate 12 and is stuck on the prism sheet 13 with a double coated tape. The light scattering guide plate 12 thereby reflects illumination light, which has been directly incident on the silver sheet 18 through the incidence surface T, toward the slope. Further, illumination light emitted through the upper edge EU is also guided toward the slope.

In order to cope with a process on the side of the emitting surface, the light scattering guide plate 12 has a roughened surface M1 in the shape of a band of a certain width on the side of the slope and the incidence surface T. The roughened surface M1 defines a diffusible area to diffusely reflect the illumination light. The roughened surface may be formed by means of matting treatment. As shown in FIG. 1 (a graph on the upper side), the matted surface (a rough surface) has characteristics so that the degree of light diffusion is reduced little by little according to distance from the incidence surface T.

Owing to the roughened surface M1, the illumination light reflected by the silver sheet 18 is scattered and reflected, while the illumination light directly incident on this roughened surface through the incidence surface T is also scattered and reflected. As a result, the illumination light is diffused more widely than before reflection. Thus, the light scattering guide plate 12 accordingly increases quantity of output light in an area corresponding to the roughened surface M1.

In the light scattering guide plate 12, since illumination light L4 guided toward the slope through the upper edge EU is also scattered by the roughened surface of the light scattering guide plate 12, the bright line is prevented from being observed from above the emitting surface. Further, the roughened surface is formed so as to reduce the degree of light diffusion little by little, and a boundary between the roughened surface and the other portion is hardly observed by the eye from the above emitting surface.

The reflection sheet 11 is made of a film, to which silver having high reflectance is adhered by means of evaporation. Light leaking out through the slope is efficiently returned to the light scattering guide plate 12 by the reflection sheet 11, and loss of illumination light is held low. Further, the reflection sheet 11 may have an absorptive area 19 in the shape of a band of a certain width (a width substantially identical with that of the roughened surface M1) on the side of the incidence surface T. The absorptive area 19 may be formed by adhering gray ink, which absorbs illumination light, by means of printing.

Figure 3:
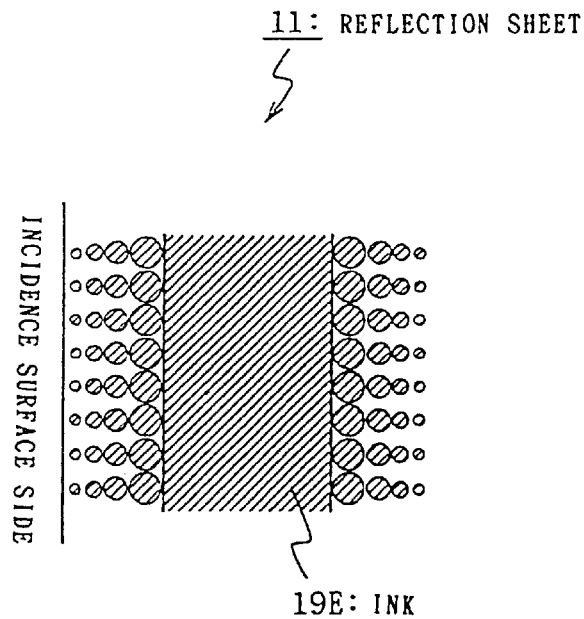
FIG. 3 is a plan view for explaining a light absorption pattern formed on a reflection sheet employed in the surface light source device of side light type shown in FIG. 1.

As shown in FIG. 3, the absorptive area 19 may include an area, in which an adhesion area of ink per unit area is enlarged according to distance from the incidence surface, another area of a certain width, to which ink 19E is wholly adhered, and still another area, in which an adhesion area of ink per unit area is reduced little by little. In the absorptive area 19 formed in this manner, a boundary between this absorbable area and the other portion is hardly observed by the eye from above the emitting surface.

Thus, as shown in FIG. 1 (a graph on the lower side), in the reflection sheet 11, after an absorption quantity of illumination light leaking out through the slope is increased according to distance from the incidence surface T, this absorption quantity is held at a certain value, and is subsequently reduced. Accordingly, in the light scattering guide plate 12, after quantity of illumination light emitted toward the emitting surface through the slope is increased in the vicinity of the incidence surface, this quantity of illumination light is once reduced, and thereafter is increased again, in association with the characteristics of the reflection sheet.

In this embodiment, the diffusible area and the absorptive area 19 are formed so that a period in change of the quantity of light corresponds to a width determined by the width of the incidence surface and the retractive index of the light scattering guide plate 12. Further, the absorptive area 19 is formed so that a position, in which the quantity of light is once reduced, corresponds to a position, in which illumination light L4 forming the bright lines is incident on the slope. That is, the absorptive area 19 is formed so as to absorb a component of illumination light forming the bright lines.

Figure 4:
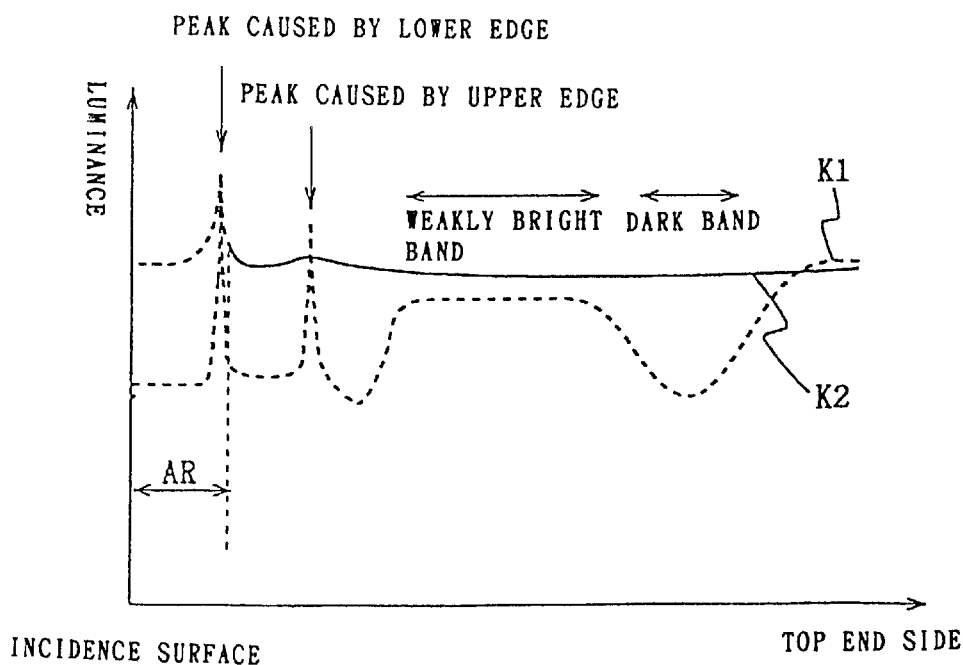
FIG. 4 shows a characteristic curve for explaining a reduction of irregularities in luminance in the surface light source device of side light type shown in FIG. 1.

In the light scattering guide plate 12, luminance level of the dark band is thereby intensified due to the diffusible area as shown by a symbol K2 in FIG. 4 to be compared with a case where no treatment is applied to the slope side. Similarly, owing to the diffusible area, the peak of a luminance level caused by the upper edge EU is restrained, while luminance level of the dark band is intensified by distributing illumination light defining the peak ever dark band portions. Further, a peak still remaining even after having been restrained due to the diffusible area in this manner is further restrained due to the absorptive area 19.

Practically, the luminance level on the side of the incidence surface is lower than that in other portions on the whole, so that if illumination light on the side of the incidence surface is diffusely reflected by the silver sheet 18 together with the illumination light guided to the slope side, it is possible to make up for illumination light more insufficient than that in other portions, and to modify an overall gradient of luminance as well.

The width of the diffusible area and that of the absorbable area may be designed in consideration of the characteristics, the size and the thickness of the light scattering guide plate 12, and further, the distribution of luminance required for output light and so on. Accordingly, the width of the diffusible area and that of the absorbable area 19 may be appropriately varied according to these various conditions. The diffusible area and the absorbable area may be set to be equal in width with each other like this embodiment, or one of the diffusible area and the absorbable area may be set to be wider than the other.

Illumination light (see FIG. 2) emitted from the fluorescent lamp 6 is introduced into the light scattering guide plate 12 through the incidence surface T directly or after having been reflected by the reflector 7. The illumination light makes a propagation while undergoing repetitive reflection between the emitting surface and the slope, and in this process, a component equal to the critical angle or less with respect to the emitting surface is emitted from the emitting surface. In the illumination light emitted from the emitting surface, directivity in a section orthogonal to the incidence surface is modified by the prism sheet 13. The directivity is reduced in the light diffusion sheet 14 following the prism sheet, and directivity in a section parallel to the incidence surface is subsequently modified by the prism sheet 15, thus providing illumination light in a frontal direction.

It should be noted that the illumination light L3 reaching the side end surfaces of the prism sheets 13, 15 and the light diffusion sheet 14 is blocked in the vicinity of the incidence surface T (see FIG. 1) by the ink 17 adhered to these side end surfaces. It is thereby possible to effectively avoid a phenomenon (so-called leak of light), in which illumination light having been incident through the side end surfaces is emitted from the emitting surface.

On the other hand, the illumination light having been incident on the light scattering guide plate 12 is reflected on the side of the incidence surface T in the emitting surface by the silver sheet 18 arranged so as to extend over the upper edge EU, and is then guided to the diffusible area on the slope side together with the illumination light in the upper edge EU. In the diffusible area, the illumination light guided by the silver sheet 18 is diffusely reflected together with the illumination light directly incident through the incidence surface, and a distribution of angles of incidence with respect to the emitting surface is reduced as a whole. Such illumination light is emitted from the emitting surface directly or after having been reflected by the reflection sheet 11 and then distributed to the dark bands, and the luminance level of the dark band is intensified.

Among the illumination light scattered in the diffusible area in this manner, the illumination light emitted from the emitting surface after having been reflected by the reflection sheet 11 is partly absorbed in the absorptive area formed on the reflection sheet 11. It is thereby possible to restrain a peak of the luminance level corresponding to the conventional bright line, which has been difficult to completely make less noticeable even after the illumination light has been diffused by the diffusible area. As a result, the luminance level on the side of the incidence surface is uniformly held as a whole.

According to this embodiment, since the illumination light is reflected by the silver sheet 18 arranged so as to extend over the upper edge, and the diffusible area and the absorbable area are provided in the shape of a band on the incidence surface side of the slope, it is possible to intensify the luminance level of the dark band by distributing the illumination light to the dark bands through diffusion. Further, it is possible to make the bright lines less noticeable by scattering a component of the illumination light forming the bright lines, and further, to effectively avoid the overall irregularities in luminance by absorbing the component of this illumination light in the absorptive area.

Second Embodiment

Figure 5:
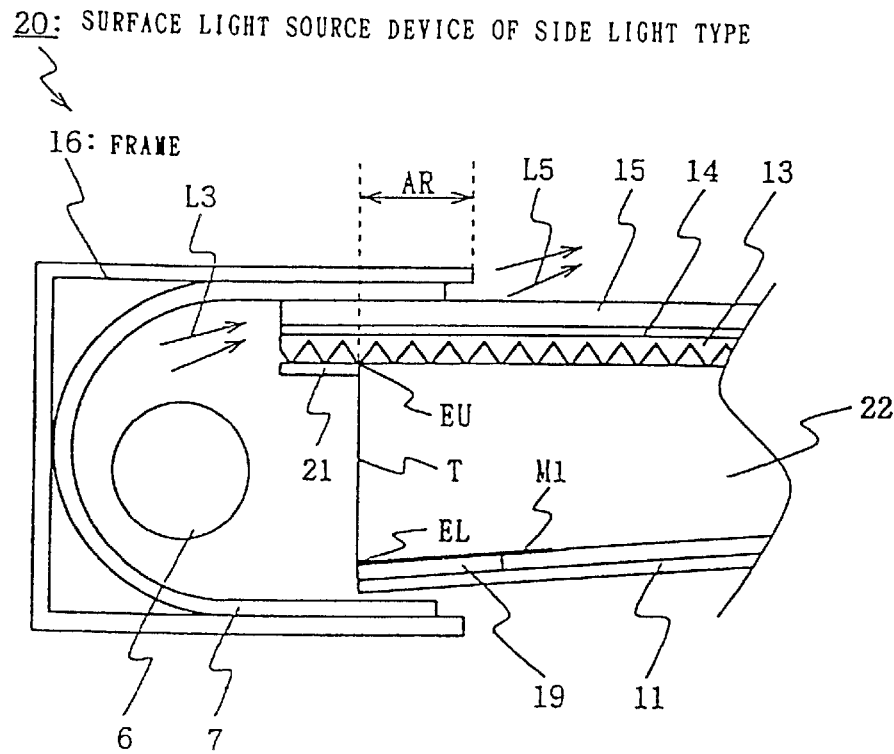
FIG. 5 is a sectional view showing a surface light source device of side light type according to the second embodiment of the present invention.

FIG. 5 is a sectional view showing a surface light source device of side light type according to the second embodiment of the present invention. In a surface light source device of side light type 20, the irregularities in luminance may be reduced by forming the slope side and the incidence surface side in this device similarly to those in the first embodiment. Further, the general luminance level is modified by positively utilizing the leak of light on the incidence surface side of the emitting surface.

A prism sheet 13, a light diffusion sheet 14 and a prism sheet 15 are laminatedly arranged directly on an emitting surface of a light scattering guide plate 22 employed in the surface light source device of side light type 20.

The prism sheet 13, the light diffusion sheet 14 and the prism sheet 15 are arranged so that the ends of these components project from the incidence surface side of the light scattering guide plate 22 toward the light source side. A silver sheet 21 is adhered to the projecting prism sheet 13 so that the end of the silver sheet is brought into contact with an incidence surface T of the light scattering guide plate 22, whereby illumination light incident on an upper edge EU of the light scattering guide plate 12 is blocked by the silver sheet 21. As a result, it is possible to prevent the upper edge from being brightly illuminated. In this manner, the surface light source device 20 effectively avoids the occurrence of bright lines.

The prism sheet 13, the light diffusion sheet 14 and the prism sheet 15 are wholly covered with a reflector 7, so that illumination light L3 is directly incident through the side end surfaces of the prism sheet 13, the light diffusion sheet 14 and the prism sheet 15 while incident illumination light L5 is emitted from the emitting surface in the vicinity of the incidence surface side. Since the illumination light L5 emitted from the emitting surface in this manner is emitted through a path other than the light scattering guide plate 22, this illumination light L5 corresponds to so-called leak of light. However, in this embodiment, the luminance level on the incidence surface side is modified by effectively utilizing this leak of light.

On the other hand, in the light scattering guide plate 22, a roughened surface M1 is formed on the incidence surface side. An absorptive area 19 is formed using ink on the reflection sheet 11 correspondingly to the roughened surface. The roughened surface M1 is formed more slightly than that in the first embodiment, and the degree of light diffusion is held low down as a whole. According to this embodiment, it is thereby possible to intensify a luminance level of a dark band, and to restrain a rise of a luminance level between dark bands by the absorptive area 19. Owing to an action of modifying the irregularities in luminance in this manner and quantity of light made up by the leak of light as described above, it is possible to flatten the overall gradient of luminance.

According to the above second embodiment, effects are expected in a way similar to the first embodiment, even when the upper edge EU is shield with the silver sheet 21 to utilize some leaking of light.

Modification

In the above second embodiment, light incident on the upper edge EU is blocked by the silver sheet 21. However, a light blocking method in the upper edge is not limited to the above second embodiment, and it may be possible to apply various light blocking methods of blocking light incident on the upper edge EU by adhering ink 23, a resin and a metal layer or the like to the upper edge EU.

Further, in the second embodiment, although description has been based on a case where light is blocked by the frame in order to cope with the bright lines caused by the lower edge EL, the present invention is not limited to the case. It may be possible to prevent the bright lines from occurring by arranging various light blocking members on the lower edge EL to block light incident on the lower edge.

Figure 6:
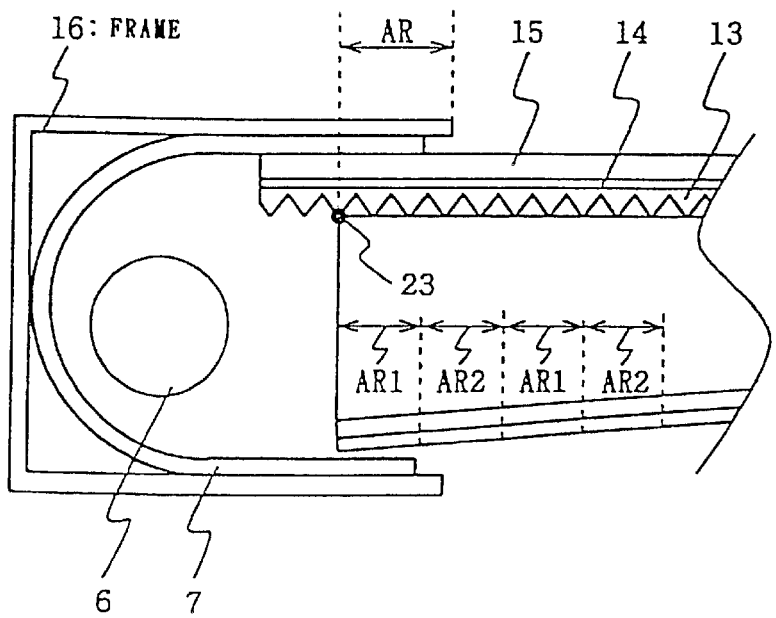
FIG. 6 is a sectional view showing a surface light source device of side light type according to a further embodiment of the present invention.

In the above embodiments, although description has been based on an arrangement in which the diffusible area is formed from the incidence surface side, and the degree of light absorption is reduced after having been increased according to distance from the incidence surface side, the present invention is not limited to the above arrangement. For instance, as shown in FIG. 6, a diffusible area AR1 and an absorptive area AR2 may be formed in an alternate manner so as to correspond to a period of occurrence of a dark band. Even in the above case, it is possible to attain the effects similar to those of the above embodiments.

Further, in the above embodiments, although the absorptive area is formed by adhering ink to the reflection sheet by means of printing, the present invention is not limited to the above embodiments. For instance, the absorptive area may be formed directly on the slope by means of printing.

In addition to the gray ink, various kinds of ink such as black ink and a coating material or the like may be employed as the ink.

Further, in the above embodiments, the diffusible area is formed on the slope of the light scattering guide plate through matting surface treatment. However, the present invention is not limited to the above embodiments. For instance, a roughened surface may be formed through blasting treatment using a sand paper or chemical etching treatment. The diffusible area may be formed through printing in white ink or the like.

In the above embodiments, while the diffusible area is formed on the slope of the light scattering guide plate, the present invention is not limited to the above embodiments. For instance, if a reduction in the general luminance level presents practically no problem, the diffusible area may be formed on the reflection sheet.

Further, in the above embodiments, the light scattering guide plate having the wedge-shaped section is employed as a light guide plate. However, the present invention is not limited to the above light scattering guide plate. In addition to a light scattering guide plate generally showing a tendency to reduce a thickness as the light scattering guide plate becomes more distant from the light source, it may be possible to use a plate-shaped light scattering guide plate. The light guide plate may be made of a transparent light guiding material, instead of the light scattering guide.

Further, in the above embodiments, while a description has been given of a case where the illumination light is introduced through one side end surface, the present invention is not limited to the above embodiments, and may be applied to a surface light source device of side light type having a structure of introducing illumination light through one side end surface totogether with the other side end surface.

Further, in the above embodiments, while a description has been given of a case where the present invention is applied to the surface light source device for a liquid crystal display, the present invention is not limited to the above embodiments, and may be widely applied to a surface light source device of side light type for various illumination apparatuses and displays or the like.

As described above, surface light source devices of side light type with emitting directivity according to the present invention comprise a diffusible area to diffusely reflect the illumination light and an absorptive area to restrain the illumination light from reflection to form bands on the side of the incidence surface on the side opposite with an emitting surface of the light guide plate, thereby realizing reduction in irregularities of output light luminance occurring in the vicinity of the incidence surface.

What is claimed is:

1. A surface light source device of side light type, which deflects illumination light incident through a side end surface of a light guide plate to emit said illumination light from an emitting surface of said light guide plate, comprising:

a combination consisting of a band-like diffusible area to diffusely reflect said illumination light and a band-like absorptive area to restrain said illumination light from reflection from bands in the vicinity of said side end surface oppositely with said emitting surface of said light guide plate, wherein said combination includes a blurred boundary area formed so that a difference between said diffusible area, said absorptive area and the rest of said light guide plate is substantially undetectable by an observer.

2. A surface light source device of side light type according to claim 1, further comprising:

a light reflection member arranged so as to extend over an edge at which said side end surface and said emitting surface of said light guide plate meet;

a light control member to modify directivity of the illumination light emitted from said light guide plate arranged on the side of said emitting surface; and a light blocking material arranged on a side end surface of said light control member, so that said illumination light emitted from said light source is prevented by said light blocking material from being directly incident on said light control member.

3. A surface light source device of side light type according to claim 1, wherein said illumination light incident on the edge adjacent of said side end surface of said light guide plate is blocked by a light blocking member, further comprising a light control member to modify directivity of the illumination light emitted from said light guide plate and arranged on the side of said emitting surface and receiving part of said illumination light emitted from said light source directly.

4. A surface light source device of side light type according to claim 1, 2 or 3, wherein said diffusible area is formed by roughening said surface opposite to said emitting surface.

5. A surface light source device of side light type according to claim 1, 2 or 3, further comprising a reflection sheet to reflect said illumination light leaking out through said light guide plate, and arranged on the side of the surface opposite to said emitting surface and wherein said absorptive area is formed by adhering a light absorptive substance to an area on said reflection sheet.

6. A surface light source device of side light type according to claim 4, further comprising a reflection sheet to reflect said illumination light leaking out through said light guide plate, and arranged on the side of the surface opposite to said emitting surface and wherein said absorptive area is formed by adhering a light absorptive substance to an area on said reflection sheet.

* * * * *

UNITED STATES PATENT AND TRADEMARK OFFICE
CERTIFICATE OF CORRECTION

PATENT NO.: 6,074,070
DATED : June 13, 2000
INVENTOR(S): Hiromi SASAKO

It is certified that errors appear in the above-identified patent and that said Letters Patent is hereby corrected as shown below:

[57]   Abstract

Line 17, delete "the" (second occurrence).

Col. 1, line 62, insert --,-- after "8B".
Col 5, line 23, change "2" to --12--.
Col. 7, line 30, change "side" to --surface (see symbol K1)--.
    line 46, change "absorbable" to --absorptive--.
    line 51, change "absorbable" to --absorptive--.
    line 53, change "absorbable" to --absorptive--.
    line 55, change "absorbable" to --absorptive--.
    line 42, change "totogether" to --together--.

Signed and Sealed this

Twenty-fourth Day of April, 2001

Attest:

NICHOLAS P. GODICI

Attesting Officer      Acting Director of the United States Patent and Trademark Office